United States Patent
Fan et al.

(10) Patent No.: US 9,694,389 B2
(45) Date of Patent: Jul. 4, 2017

(54) METHODS FOR PRODUCING COAXIAL STRUCTURES USING A MICROFLUIDIC JET

(71) Applicants: Fa-Gung Fan, Fairport, NY (US); David Bohling, Fort Collins, CO (US); David Michael Keicher, Albuquerque, NM (US); Marcelino Essien, Cedar Crest, NM (US)

(72) Inventors: Fa-Gung Fan, Fairport, NY (US); David Bohling, Fort Collins, CO (US); David Michael Keicher, Albuquerque, NM (US); Marcelino Essien, Cedar Crest, NM (US)

(73) Assignee: Integrated Deposition Solutions, Inc., Albuquerque, NM (US)

( * ) Notice: Subject to any disclaimer, the term of this patent is extended or adjusted under 35 U.S.C. 154(b) by 735 days.

(21) Appl. No.: 13/892,241

(22) Filed: May 10, 2013

(65) Prior Publication Data

US 2014/0027952 A1    Jan. 30, 2014

Related U.S. Application Data

(60) Provisional application No. 61/674,962, filed on Jul. 24, 2012.

(51) Int. Cl.
*B05D 5/12* (2006.01)
*B29C 67/00* (2017.01)

(52) U.S. Cl.
CPC ............ *B05D 5/12* (2013.01); *B29C 67/0051* (2013.01); *B29C 67/0059* (2013.01)

(58) Field of Classification Search
CPC ............ B29C 67/0051; B29C 67/0055; B29C 67/0059; B29C 67/0062; B29C 67/0085;
(Continued)

(56) References Cited

U.S. PATENT DOCUMENTS 5,674,743 A * 10/1997 Ulmer ........................ 435/287.2
6,402,403 B1 * 6/2002 Speakman ............... 400/120.03
(Continued)

*Primary Examiner* — Alison L Hindenlang
*Assistant Examiner* — Mohamed K Ahmed Ali

(57) ABSTRACT

The object of the invention is the provision of methods for controlled production of continuous multi-component filaments or discreet structures using a multi-component liquid jet issuing from an orifice. A multi-component jet consists of two or more liquids. The liquids may be miscible or immiscible, and form a co-axially propagating flow along the central axis of a flow cell. The working distance between the exit orifice and a substrate can be as large as 50 mm, so that in-flight processing of the jet is possible. The coaxial flow consists of an outer sheath liquid and an inner sample liquid or composite of liquids. The flow cell and the exit channel of the deposition head are heated so that the pressurized sheath liquid temperature is raised to near or above the boiling point of the sheath liquid at the local atmospheric pressure. The jet exits the deposition head through the orifice, and the outer liquid is evaporated as the jet falls at atmospheric pressure. The sheath liquid is processed thermally, optically, or chemically during flight to form a protective or insulating layer for the inner liquid or liquids. The inner liquids may contrastingly consist of an ultraviolet (UV) curable ink that is processed in-flight or after deposition. Since UV curable inks contain no volatile components, the coaxial jetted filament can be processed without producing cracks or bubbles in the sheath layer. Line widths are produced in the range from approximately 1 to 1000 microns.

12 Claims, 3 Drawing Sheets

(58) Field of Classification Search
CPC ....... B01D 2325/028; B01L 2200/0636; B01L 3/502707; B01L 3/502776; B05D 5/12
USPC .............................................. 264/401, 171.1
See application file for complete search history.

(56) References Cited

U.S. PATENT DOCUMENTS

| | | | |
|---|---|---|---|
| 2009/0073548 A1* | 3/2009 | Youngs | 359/321 |
| 2010/0286791 A1* | 11/2010 | Goldsmith | 623/23.7 |
| 2010/0297906 A1* | 11/2010 | Steckl et al. | 442/347 |

* cited by examiner

METHODS FOR PRODUCING COAXIAL STRUCTURES USING A MICROFLUIDIC JET

RELATED U.S. APPLICATION DATA

Provisional application No. 61/674,962 filed Jul. 24, 2012.

REFERENCES CITED
U.S. Pat. Nos.

| | | |
|---|---|---|
| 3,416,730 | December, 1968 | Perry |
| 4,196,437 | April, 1980 | Hertz |
| 7,323,133 B2 | January, 2008 | Maccagnan et. al. |
| 8,322,025 | December, 2012 | Fork et. al. |

OTHER PUBLICATIONS

Lei, S. (2011). Dripping and Jetting in Coflowing Liquid Streams. *Advances in Adaptive Data Analysis*, 3(1&2), 269-290.

Morrison, N. F. (2010). Viscoelastic Inks in Inkjet Printing. *11th Pan-American Congress of Applied Mechanics*. Foz do Iguacu.

Utada, S. A. (2008). Absolute Instability of a Liquid Jet in a Coflowing Stream. *Phys. Rev. Lett*, 100.

FIELD OF THE INVENTION

Embodiments of the invention generally relate to microfluidic jetting devices, particularly devices for direct printing of coaxial traces on a surface or extrusion of liquid filaments.

BACKGROUND OF THE INVENTION

General Description of Hydrodynamic Focusing

The invention discloses a method for the production of multi-component coaxial filaments using a hydrodynamically focused compound liquid jet. A compound liquid jet is defined as a jet propagating with an annular distribution of one or more inner flows surrounded by an outer sheath flow. In hydrodynamic focusing, an annular distribution of a core liquid and a sheath liquid is forced through a channel or nozzle, with the core liquid being stretched into a thin filament as the liquids accelerate through the constriction. The width of the core filament is a function of the ratio of the core and sheath flow rates. In hydrodynamic focusing, the diameter of the core liquid is proportional to the fractional volume occupied by the core liquid. As the ratio of the core liquid flow rate to the sheath liquid flow rate is decreased, the volume occupied by the core liquid decreases, and thus reduces the diameter of the core liquid filament. In hydrodynamic focusing applications, the core liquid is stretched into a filament with a width as small as 1 micron. The core liquid can be a single liquid or an annular distribution of several co-propagating liquids.

The feasibility of a traditional single-component liquid jet printing method depends largely on the ability of the process and apparatus to deliver ink at a useful rate. The maximum practical deposition rate is determined by the maximum velocity and acceleration of the state of the art motion control system. Stable delivery of an ink from a liquid jet apparatus becomes difficult for nozzle diameters less than approximately 50 microns. Indeed, clogging of small diameter nozzles by trapped bubbles or solid particles can be problematic for jetting systems, rendering such nozzles impractical for prolonged use. The invention circumvents the problem of clogging by using a multi-component approach, wherein one or more inner liquids are propelled by an outer sheath flow through a larger diameter external nozzle. The relatively large diameter of the exit nozzle greatly reduces the occurrence of clogging, and helps to stabilize the deposition process. The inner flow is forced through an inner nozzle in a dripping mode, at flow rates on the order of milliliters per hour, while the sheath liquid is transported through an exit nozzle at flow rates of tens of milliliters per hour.

Coaxial Jetting

A coaxial jet is formed when the inner filament and outer sheath liquid are jetted from an output orifice to form an annular liquid jet. In 1969 (U.S. Pat. No. 3,416,730), Perry disclosed an apparatus for the production of multiple liquid jets, initially in contact, but without substantial mixing. Hertz (U.S. Pat. No. 4,196,437) discloses a method and apparatus for forming a compound liquid jet that breaks into droplets in an inkjet printing application. The present invention produces a coaxial jet consisting of two or more annular liquid streams with limited actual contact time, minimizing diffusivity and producing a stable jet with a breakup distance of at least five centimeters.

DESCRIPTION OF THE PRIOR ART

Coextrusion

In a coextrusion process two liquids are combined in a flow cell to produce an annular flow of a sheath and core liquid. Examples of coextrusion include the manufacture of cladded optical fibers and hollow core optical fibers. The coextrusion process can be used to form polymer-coated glass optical fibers. Maccagnan (U.S. Pat. No. 7,323,133 B2) has disclosed a method for coextrusion of ceramic microtubes, defined as tubular structures with characteristic dimensions on the order of microns. Fork (U.S. Pat. No. 8,322,025) describes an apparatus for forming high-aspect ratio gridline structures using a coextrusion process.

SUMMARY OF THE INVENTION

A Brief Description of the Drawings

DETAILED DESCRIPTION OF THE PREFERRED EMBODIMENTS

General Description of the Device

Figure 1:
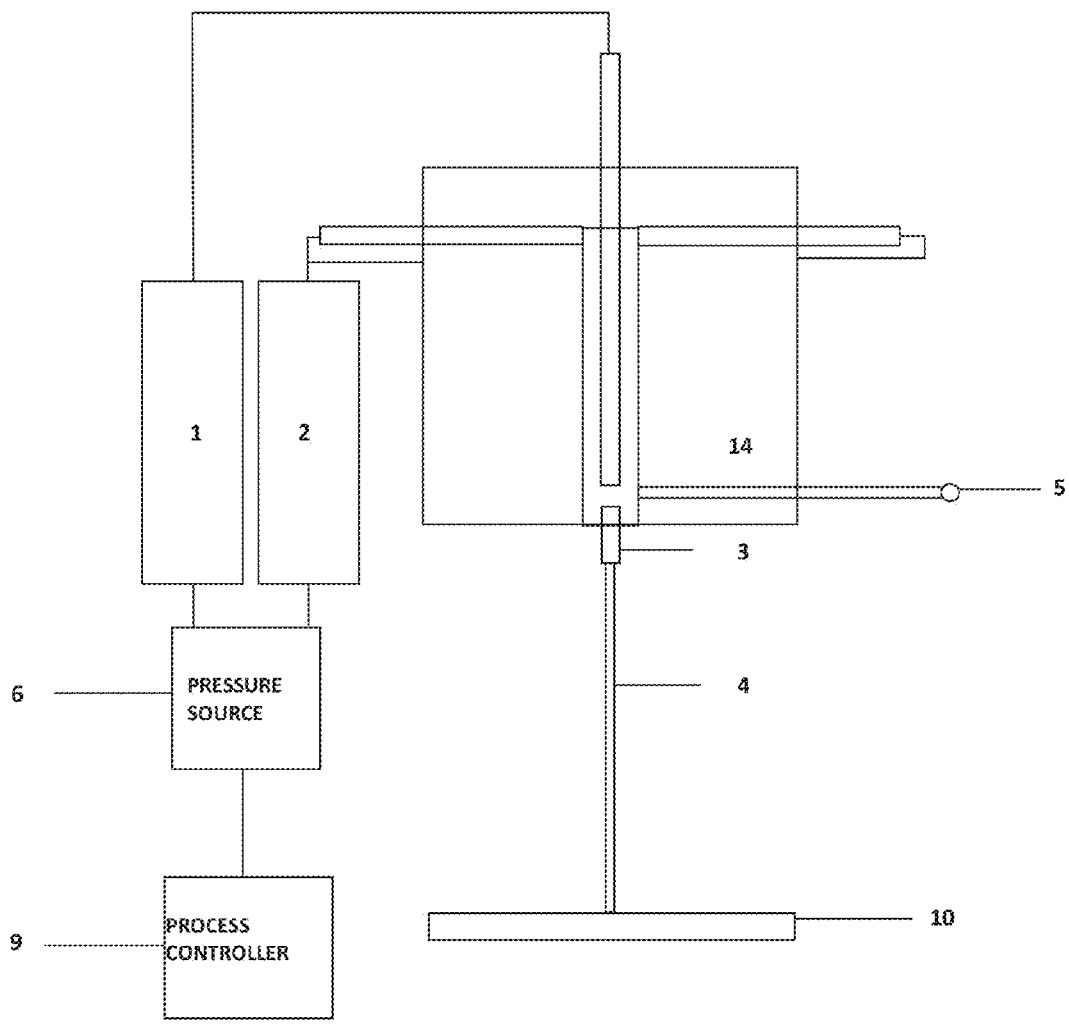
FIG. 1 shows a schematic of a pressure-stabilized Liquid Jet Apparatus.

In a generalized case, the device consists of a pressure source and sample chamber or a syringe pump, a deposition head, a liquid orifice, a nozzle heater, a substrate heater, and a process control system. A general embodiment of the device is shown in FIG. 1. Liquid samples are pumped to the flow cell 14 by a syringe pump, or by a pressure source 6 above the chambers containing the liquid samples. Liquids are delivered to a nozzle from sources 1 and 2. The nozzle position is fixed with respect to the deposition head, and a continuous coherent stream of liquid is jetted from the nozzle orifice. The device parameters and fluid parameters are chosen such that in an inactive state, the surface tension force of the liquids is greater than the hydrostatic force of the column of liquid at the orifice 3. Fluid flow is initiated when the total downward force is greater than the surface tension force. The total downward force is increased by pressurizing the liquid. When the pressure at the liquid orifice reaches a value $P_0$ that is dependent on the jet orifice diameter, and the surface tension of the liquid, a jet 4 is produced. In the preferred embodiment, a two-component jet is ejected from the nozzle. The signal from a pressure transducer 5 is input to a process controller 9. A pressure feedback circuit is used to maintain the pressure within the system by controlling the liquid flow to the orifice. At an appropriate flow rate the resulting liquid filament forms a continuous line as it strikes a moving substrate before Rayleigh instabilities break the filament into individual droplets. Under the correct conditions involving jet diameter, flow rate, liquid viscosity, and substrate height and speed, a continuous line with sub-micron edge definition is printed on a substrate 10.

General Description of the Method

Direct printing of multi-component traces deposited in a coaxial configuration is enabled using multiple annular inner flows surrounded by an outer sheath flow. In the generalized embodiment of the invention, all components of the compound jet are non-sacrificial, and are used to form a part of the deposited structure. Key to the deposition process is the practice of depositing the liquid onto a moving substrate with the substrate placed at a distance from the orifice that is less than the distance at which the jet breaks into droplets. Breakup of the jet is a function of Rayleigh instabilities that invariably occur with increasing distance from the orifice. In one embodiment of the device immiscible liquids are chosen so that the outer liquid acts to focus the core liquid to diameters in the range from 1 to 100 microns.

Many researchers have reported results obtained from compound liquid jets. (Utada, 2008) and (Lei, 2011) have reported that, in co-flowing systems of two immiscible liquids, the dripping to jetting transition is determined by the Weber number of the inner flow or the capillary number of the outer flow. The processes and apparatuses of the present invention operate in the regime in which the transition from dripping to jetting is determined by the capillary number of the sheath flow. An unperturbed liquid jet will eventually break up into droplets as the liquid filament moves towards a configuration that minimizes its surface area. In the present invention, the physical and operational parameters of the system and the fluid properties of the liquids are chosen so that the breakup distance of the jet is greater than 10 cm, and as long as 20 cm.

Figure 2:
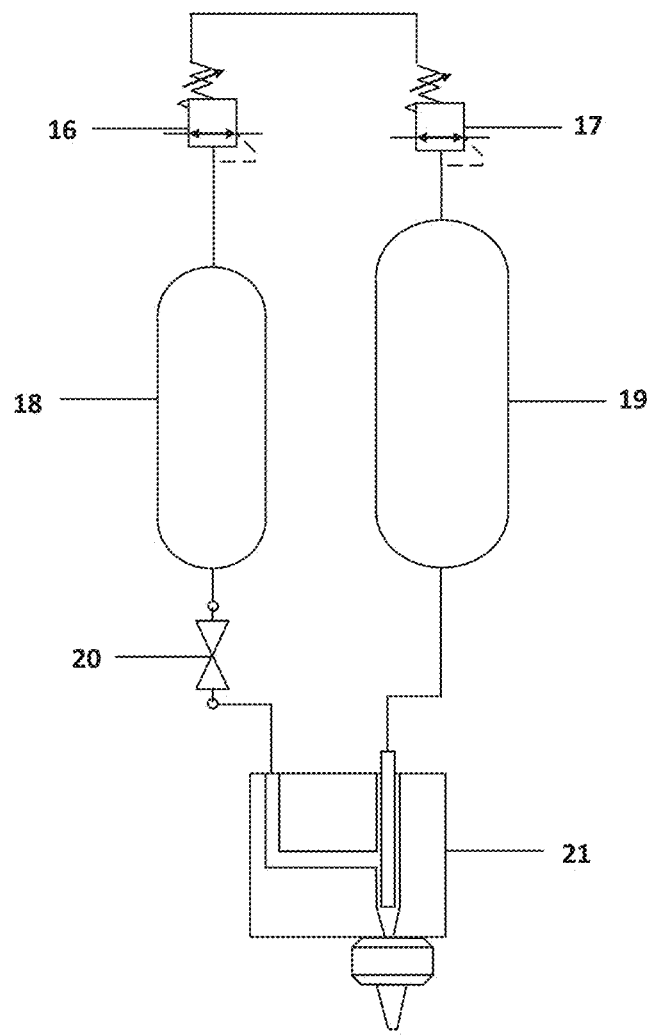
FIG. 2 shows a general schematic of the pressurized components of the invention.

FIG. 2 shows the pneumatic components of the microfluidic print head. A pressure source 15 is connected to pressure regulators 16 and 17. A sample chamber 18 is connected to pressure regulator 16, while a sheath chamber 19 is connected to pressure regulator 17. A valve 20 interrupts the flow of the sample liquid to the flow cell 21.

Two-Component Flow

One object of the invention is direct printing of electronic inks and various liquid compositions on various surfaces. In order for the deposition process to be feasible, an upper limit of the sample deposition rate is set by the maximum achievable speed and acceleration of typical motion control systems. The flow is continuous, and the flow rate upper limit $Q_{max}$ is generally in the range of approximately 1 to 5 ml/hr. The flow rate through an orifice is inversely proportionate to the orifice diameter, and for inks with viscosities in the range of 1 to 5 cP, a practical $Q_{max}$ is obtained with orifice diameters from approximately 10 to 25 microns. An apparatus using an orifice diameter greater than approximately 50 microns will produce flow rates that are too large to be useful for conventional direct printing. The traditional continuous single-component jetting process however becomes unstable due to clogging for orifice diameters less than approximately 50 microns. The present invention uses a two-component flow to reduce the effective diameter of the orifice by channeling the sample liquid (ink) through a sheath liquid. The sheath and sample liquids form an annular flow, with the sample liquid in the interior of the flow. The liquids exit the orifice, and the sheath liquid is modified as the pressurized liquid column is jetted into the ambient atmosphere.

Multi-Component Flow

Figure 3:
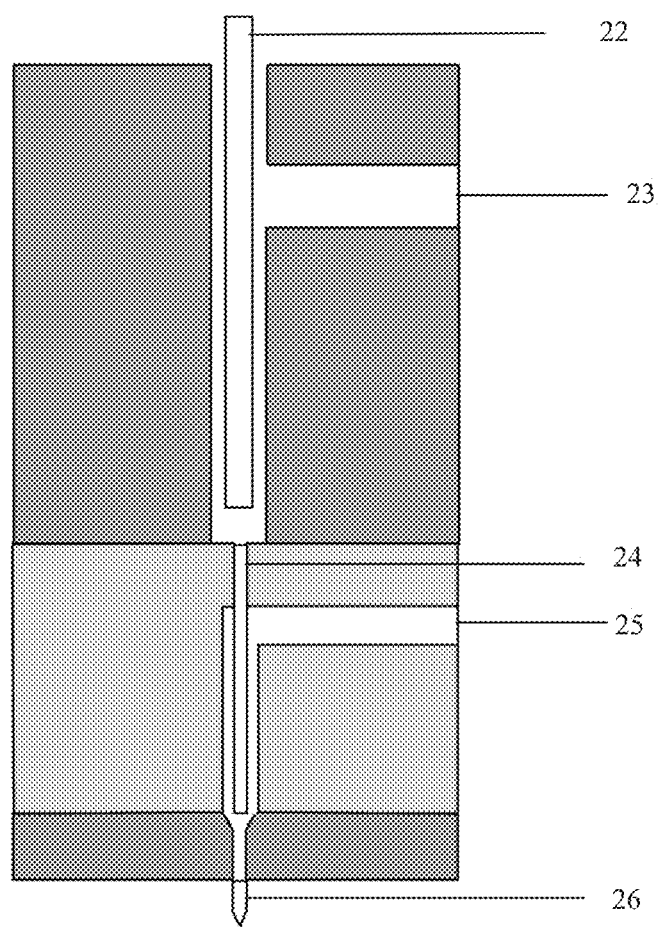
FIG. 3 shows a multi-component coaxial jet with optical processing.

In the present invention, multi-component flow is generally defined as an annularly propagating flow of two or more liquids. The sheath flow is non-sacrificial. The typical configuration is that of an outer sheath flow and two or more inner liquids propagating in an annular flow. A schematic of the embodiment is shown in FIG. 3. Liquid 1 enters the flow cell through a first channel 22. Liquid 2 enters the flow cell through a first port 23, is combined with liquid 1, and enters a second channel 24. A sheath liquid enters the flow cell through a second port 25, and is combined with the annular flow consisting of liquids 1 and 2. The coaxial liquids distribution then enters the exit orifice 26, undergoes in-flight process by an optical radiation source or a thermal source. In a similar embodiment, the sheath flow is heated to produce rapid evaporation of the volatile components of the sheath liquid upon exit from the orifice. The number of liquids combined in the flow cell may be increased by inserting the section of the cell that consists of a port, an entrance channel for the upstream flow, and an exit port that can be fitted to still another section or to an exit orifice.

Chemically Reacting Sheath and Core Liquids

In one embodiment multiple core liquids are reactive liquids whereby a reaction causes a change in properties to occur in the one or more core liquids, the sheath liquid, or both the sheath and core liquids. An example is the use of plating materials where two chemicals are brought together in an inner flow in the print head, and a reaction causes the core liquids to form a metal filament as it passes through the print head. The reaction could also occur at the exit of the print head. In another embodiment the core liquids and sheath liquid are consumed during the reaction to form hollow structures or to provide an alternative means to deplete the sheath material to effect a single material deposition.

Partial Evaporation of the Sheath Liquid—Conversion of Superheat to Latent Heat of Vaporization In one embodiment of the device, a thermal assist is used to preferentially evaporate the volatile components of the sheath liquid from the compound jet. The sheath liquid is a non-sacrificial flow that reduces the diameter and the flow rate of the sample liquid as the flows emerge from the exit orifice. Fine line printing and multi-component printing are facilitated when the sheath flow is partially or completely evaporated before striking the substrate.

The sheath liquid is typically composed of at least one volatile component that evaporates preferentially, leaving a moderate to high-viscosity flow. One example of a sheath liquid of the invention is a dilute aqueous polymeric solution. Rapid evaporation of the water in the solution is accomplished by using a heater assembly to raise the temperature of the pressurized sheath flow. The sheath liquid is held above atmospheric pressure within the sample chamber, flow cell, and exit channel, at a temperature above the boiling point of the sheath liquid at atmospheric pressure. As the sheath liquid exits the orifice and encounters the reduced ambient pressure, the energy used to raise the liquid above its atmospheric pressure boiling point is converted into latent heat of fusion, and rapid evaporation of the aqueous component of the sheath liquid takes place.

Limited Diffusion and Viscoelastic Core Liquids

In some inkjet printing applications, viscoelastic inks are used to improve the deposition quality of the printed droplets. (Morrison, 2010) provides a summary of the use of viscoelastic inks formulations in inkjet printing. A viscoelastic ink will undergo an increase in viscosity has the strain rate on the liquid is increased. In inkjet printing, viscoelastic inks are used to minimize the formation of satellite droplets. Higgins (U.S. Pat. No. 8,398,226) discloses and inkjet printing system in which the rheology of an ink changes with the application of a temperature gradient, so that the viscosity of the ink increases upon deposition. Similarly, viscoelastic inks can be used in a multi-component jet to improve the print quality of the deposited filament.

In-Flight UV Curing

The large working distance between the exit orifice and the substrate allows for in-flight processing of the compound jet. In one embodiment a source of ultraviolet (UV) radiation is used to partially or fully cure the compound jet. The inner and outer flows are typically polymeric compositions, and are cured without the production of volatile species. Processing of the inner flow is therefore accomplished with no degradation to the outer sheath flow in the form of the production of cracks or bubbles.

Hybrid Processing

In yet another embodiment, the inner flows are processed using UV curing while the sheath liquid is processed thermally or optically. The sheath flow may be heated to a temperature at which volatile components undergo vaporization, increasing the viscosity of the sheath liquid. Heating of the sheath flow may be accomplished using a common heating device, such as a resistance heater, or by using laser radiation that is transparent to the inner liquids, but targeted to the absorption spectrum of the sheath flow.

Two-Dimensional Coaxial Structure

One embodiment of the invention is a device for deposition of a two-dimensional, two-component, coaxial structure. The invention is capable of the direct printing of a coaxial "wire" with a conductive core diameter in the range from 10-100 microns in diameter, and an insulating sheath outer diameter of 250-500 microns. Presently available techniques for direct printing of insulated conductors require a multi-step process of depositing and processing at least three separate layers for an insulator-conductor-insulator configuration. In some cases, multi-step processes require extreme tool registration/positional accuracy in order to properly deposit successive layers leading to very high cost platforms and generally very slow total print speeds using currently known deposition methods.

3D Printing

The present invention can also be used to build three-dimensional structures using a layer-wise process, wherein simple and complex objects are printed directly from a computer-automated drawing (CAD) file. In the 3D printing process, laser-assisted deposition or a viscoelastic ink is used to deposit a liquid filament with a viscosity sufficient to form a rigid or semi-rigid structure upon which subsequent layers are deposited. In the 3D printing technique, a digital model of an object is intersected with horizontal planes. The horizontal planes form cross sectional representations or slices of the object. Information in each slice is uploaded to a computerized motion control system, so that a solid object can be fabricated using an additive manufacturing process. The Liquid Jet process can be used to fabricate three-dimensional objects from materials including, but not limited to metals, ceramics, and plastics.

In one embodiment of the invention, the sheath liquid is composed of a dilute polymeric solution that is cured to form a binder that allows the inner liquid to be patterned into three-dimensional shapes.

Passivation

Many applications in electronics, microelectronics, biology, and other areas require deposition of structures in corrosive environments where the deposited materials may come into contact with oxygen, water, or other potentially corrosive substances. In the cases of deposition into corrosive environments, a coaxial trace can be printed with a polymer or ceramic outer layer that serves to protect the inner material. In general, the multi-component jet approach can be used to deposited traces protected by polymer, oxide, or other passivating layers.

Electrical Insulation

Multi-component coaxial jetting can also provide electrical isolation for overlapping circuit traces. In this case, overlapping traces can be deposited on a surface using a single pass for each trace, instead of a multi-step printing process involving deposition of a single-component trace followed by material processing of the trace before a subsequent layer is added.

Surface-Mounted Sensors

The jetted insulated wire concept can be used to facilitate direct printing of electrical devices on metallic surfaces, such as strain gauges, temperature sensors, and humidity sensors. The real-time deposition of an insulated conductor trace eliminates the requirement that the circuit be printed on a secondary surface that is then mounted onto the surface of the object to be examined.

Conductive Textiles

The present invention can be used to print insulated conductors directly onto the surface of a fabric for the purpose of depositing a printed electronic circuit onto a wearable garment or a textile cover. Examples of printed electronic circuits deposited on textiles, or E-textiles, using the invention include, but are not limited to wearable antennae, radio frequency identification tags, temperature sensors, pressure sensors, and chemical sensors.

The method can also be used to form threads of insulated conductor that can be collected and woven into an existing fabric, thereby producing a conductive textile or fabrics with circuitry.

In still another embodiment, the invention is used to print insulated conductors onto fabric to form electrical interconnects for power and signal transmission between power sources and various electronic components such as transistors, capacitors, and LED's, and between microprocessors, sensors, and actuators.

The invention claimed is:

1. A method for printing coaxial features on a surface, the method comprising;
   forming an annular compound flow of liquids within a flow cell, the flow consisting of one or more inner flows surrounded by a non-sacrificial sheath flow;
   hydrodynamically focusing the inner flows in said flow cell;
   forming a stable compound jet consisting of one or more inner liquid flows surrounded by a non-sacrificial outer sheath flow;

increasing the viscosity of the sheath and one or more of the inner flows of the in-flight compound jet before breakup of the compound jet;

depositing an intact compound structure on a surface by impacting a moderate to high-viscosity compound jet on a surface before breakup of the compound jet;

shuttering the compound jet by valving the inner flows and interrupting the remaining sheath flow using an external shutter.

2. The method of claim 1 wherein features are printed on a substrate attached to a motion control system with at least two degrees of freedom.

3. The method of claim 1 wherein feature are printed on a stationary substrate by a moving print head with at least two degrees of freedom.

4. The method of claim 1 wherein the viscosity of the sheath fluid is increased by in-flight partial evaporation of a volatile component of the sheath fluid.

5. The method of claim 1 wherein one or more components of the inner flow and the sheath flow are partially or fully cured using an in-flight UV curing process.

6. The method of claim 1 wherein one or more inner components of the jet are cured or partially cured using UV processing and the remaining components are treated using an evaporative process.

7. The method of claim 1 wherein a desired product is formed through a chemical reaction of one or more components of the compound jet inner flow.

8. The method of claim 1 wherein the sheath flow of the compound jet is depleted through a chemical reaction with one or more components of the inner flow.

9. The method of claim 1 wherein core liquids are reactive liquids whereby a reaction causes a change in properties to occur in the one or more core liquids, the sheath liquid, or both the sheath and core liquids.

10. A method of printing an insulated conductor on a surface from a compound liquid jet consisting of one or more inner components surrounded by a sheath component, the method comprising;

forming an annular compound flow of liquids within a flow cell, the flow consisting of one or more inner flows surrounded by a non-sacrificial sheath flow;

hydrodynamically focusing the inner flows in said flow cell;

forming a stable compound jet consisting of one or more inner liquid flows surrounded by a non-sacrificial outer sheath flow;

increasing the viscosity of the sheath and one or more of the inner flows of the in-flight compound jet before breakup of the compound jet;

depositing an intact compound structure on a surface by impacting a moderate to high-viscosity compound jet on a surface before breakup of the compound jet;

shuttering the compound jet by valving the inner flows and interrupting the remaining sheath flow using an external shutter.

11. The method of claim 10 wherein insulated conductive traces are printed directly onto a fabric.

12. The method of claim 10 wherein a three-dimensional structure is printed from a CAD file in a layer-wise fashion.

* * * * *